Feb. 24, 1959     A. E. ANDERSON, JR     2,874,508
READILY ATTACHABLE AND DETACHABLE FISHING FLOAT
Filed May 29, 1956
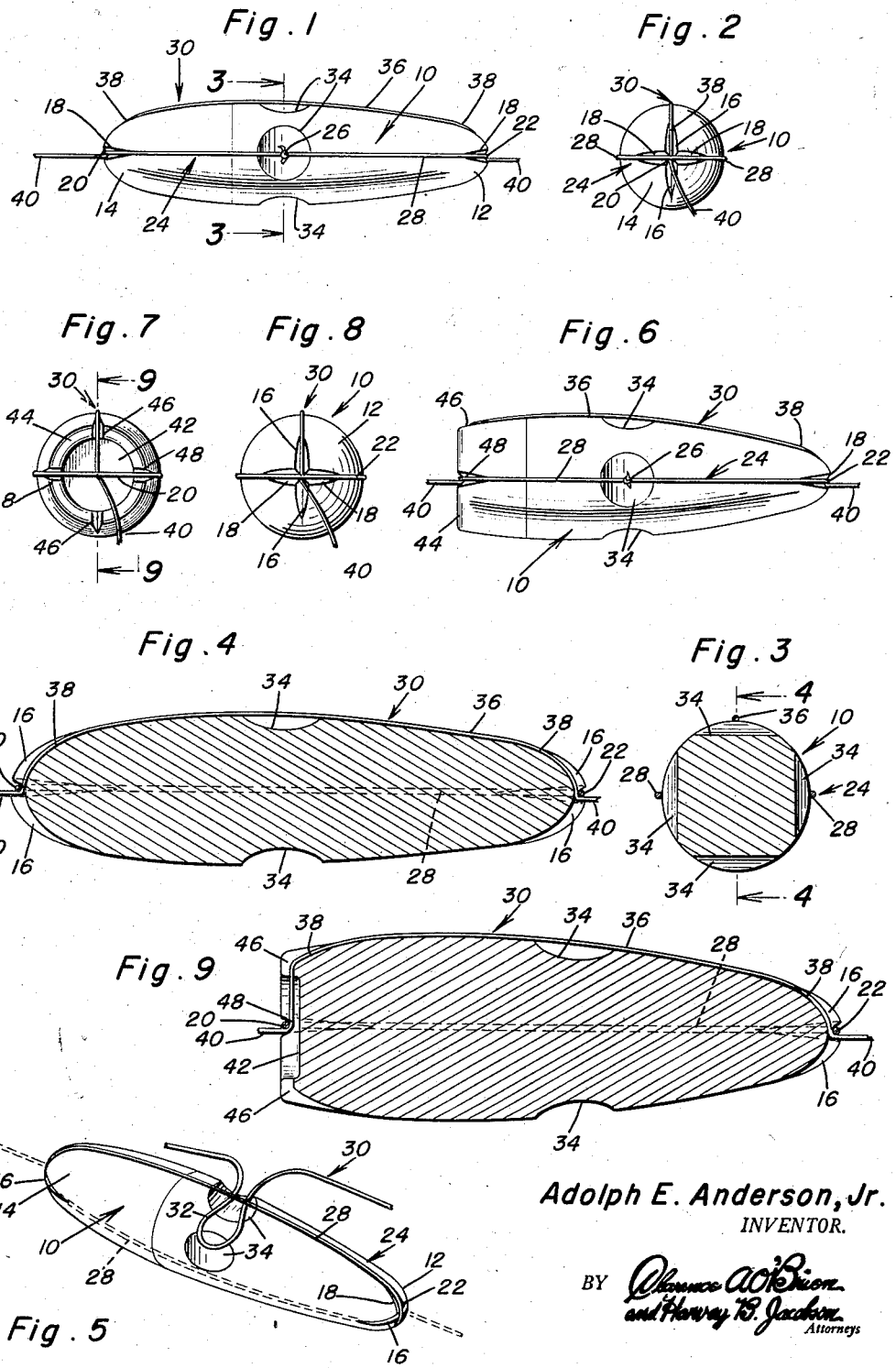
Adolph E. Anderson, Jr.
INVENTOR.

United States Patent Office 2,874,508
Patented Feb. 24, 1959

2,874,508
READILY ATTACHABLE AND DETACHABLE FISHING FLOAT

Adolph E. Anderson, Jr., Houston, Tex.

Application May 29, 1956, Serial No. 588,147

1 Claim. (Cl. 43—43.1)

This invention relates to a fishing line float which is so constructed that it may be attached to a fishing line at the desired point of attachment between the pole and baited end of the line without removing the already attached sinker and hook.

Another object of the invention is to so construct the float that the line is hitched or attached thereto by a float embracing harnessing element so constructed and arranged and cooperating with the leading and trailing ends of the float that all that one has to do it to loop the fishing line and manipulate the portions of the line on opposite sides of the loop in such a manner that they may be releasably hitched to the respective ends of the float and just as easily unhitched so that the line may be detached from said float.

Briefly, the invention pertains to an elongate float, a line having a limited portion stretched lengthwise and contacting the exterior surface of the body, and means cooperable with the respective end portions of said body whereby cooperating portions of the line are harnessed and detachably hitched in place on said body.

Other objects, features and advantages will become more readily apparent from the following description and drawings:

In the drawings:

Fig. 1 is an elevation of the improved float showing how it is constructed and detachably connected with the fishing line;

Fig. 2 is an end elevation;

Fig. 3 is a section on the line 3—3 of Fig. 1;

Fig. 4 is a section on the line 4—4 of Fig. 3;

Fig. 5 is a perspective view showing how the fishing line is looped for purposes of detachably hitching the float on the line;

Fig. 6 is an elevation similar to Fig. 1 showing a slight modification at the left;

Fig. 7 is an end elevation of Fig. 6 looking at the same from left to right;

Fig. 8 is an end elevation looking in the opposite direction; and

Fig. 9 is a longitudinal section on the line 9—9 of Fig. 7.

Referring first to the embodiment of the invention seen in Figs. 1 to 5, inclusive, the buoyant body, here treated as a float, is an elongate wooden or equivalent plug and is denoted by the numeral 10. The leading and trailing ends 12 and 14 are rounded or convexly formed and each end of the construction seen in Fig. 2 wherein it will be observed that cruciform grooves centrally intersect, the grooves being denoted by the numerals 16 and 18 at both ends and these grooves providing what are conveniently described here as keeper seats. The keeper seats 18 accommodate the respective bight portions 20 and 22 of the tightly wrapped cord or flexible loop 24. Actually this is a permanently attached length of strong cord or wire which has its end portions joined by a knot 26 on one side (Fig. 1) whereby longitudinal side portions are looped as at 28 and extend along opposite sides of the float. This element may be treated either as a harnessing loop or a hitching bridle. The fishing line (Fig. 5) is denoted by the numeral 30 and a portion thereof is shaped and held between the fisherman's fingers to form a loop 32. The intermediate portion of the float has cutouts or clearance recesses 34 so that the loop can be slipped between the tightly bound bridling and hitching loop 24. By thus threading the doubled portion 32 through the recess in the manner shown, portions of the line on opposite sides thereof may be respectively drawn and seated and hitched and held in their respective keeper seats. Figs. 1 to 4 inclusive show how the line looks after it is applied. Here a lengthwise portion of the line 36 extends from end to end and contacts the float and the lateral end portions 38 are bent so to speak and then drawn down through their upper keeper notches 16 where they are bridged over the bight portions 20 and 22 and firmly hitched and retained in their respective seats with the portions 40 of the line extending beyond the end portion of the float in an obvious manner. It is to be pointed that the essence of the invention is, of course, in the construction of the harness-equipped float in Fig. 5, for example, regardless of the line since the purpose of the invention is to apply and remove the float and to construct the float so that this end can be accomplished. Actually when the float is attached to the line in the manner illustrated in the drawings it "stays put" in the selected position. However, it is possible by catching hold of the line with one hand and sliding the float forcibly with the other hand to shift the float or adjust it along the line. In other words, the float is not such that the line slides freely relative to the float or vice versa.

The form of the invention seen in Figs. 6, 7, 8 and 9 is substantially the same as that already described except that the left hand end in Figs. 6 and 9 or the end seen also in Fig. 7 varies slightly in construction. To avoid duplication of description therefore, the same number is applied to the parts already described and it seems necessary merely to point out that this left end is centrally recessed as at 42 to form an outstanding endless rim 44 and this is in turn provided with pairs of diametrically opposite keeper notches or keeper seats 46, 46 and 48, 48 to serve as alternates for the aforementioned keeper notches or keeper seats 16 and 18 respectively. The end portion 20 (Fig. 7) of the looped cord or wire 24 stretches tightly across the recess and applies sufficient tension on the line end 30 to harness it in place. The harness or bridle loop 24 may in many instances be constructed of a length of wire. The float is so constructed and designed to speed up the job of hitching it on the fishing line, or detaching it therefrom as the case may be. Once it is hitched in place it may be slipped up or down the line by merely applying the necessary force to do so.

What is claimed as new is as follows:

An attachment for a fishing line comprising an elongated rigid float body having its opposite end portions notched to provide a plurality of keeper seats, an endless and stretchless fishing line attaching and retaining bridle tightly embracing the float body with all portions thereof hugging the cooperating surface portions of the float body and having bight portions seated in some of said keeper seats, median portions of the exterior surface of said float body having individual circumferentially spaced recesses spanned by cooperating portions of the bridle and said notches and cooperating portions of the bridle serving to facilitate the passing of a looped portion of a fishing line between said bridle and said float body in a manner to attach the fishing line to the float body to be held temporarily on the float body with the aid of other of said cooperating keeper seats and portions of the bridle which serve to seat and maintain the fishing line in the keeper seats.

References Cited in the file of this patent

UNITED STATES PATENTS

| | | | |
|---|---|---|---|
| 290,154 | Vidal | Dec. 11, | 1883 |
| 631,197 | Bourke | Aug. 15, | 1899 |
| 774,429 | Hurlbut | Mar. 8, | 1904 |
| 1,883,574 | Cleeland | Oct. 18, | 1932 |
| 2,143,942 | Gruenhagen | Jan. 17, | 1939 |
| 2,393,070 | Saloun | Jan. 15, | 1946 |
| 2,699,624 | Vawryk | Jan. 18, | 1955 |
| 2,706,869 | Shoenfelt | Apr. 26, | 1955 |
| 2,775,843 | Leiser | Jan. 1, | 1957 |
| 2,834,143 | Bibeau | May 13, | 1958 |